July 28, 1925.

M. J. OWENS 1,547,439

GLASS FORMING MACHINE

Filed Aug. 11, 1921

INVENTOR

MICHAEL J. OWENS

BY J.F.Rule

HIS ATTORNEY

July 28, 1925.
M. J. OWENS
GLASS FORMING MACHINE
Filed Aug. 11, 1921
1,547,439
8 Sheets-Sheet 2
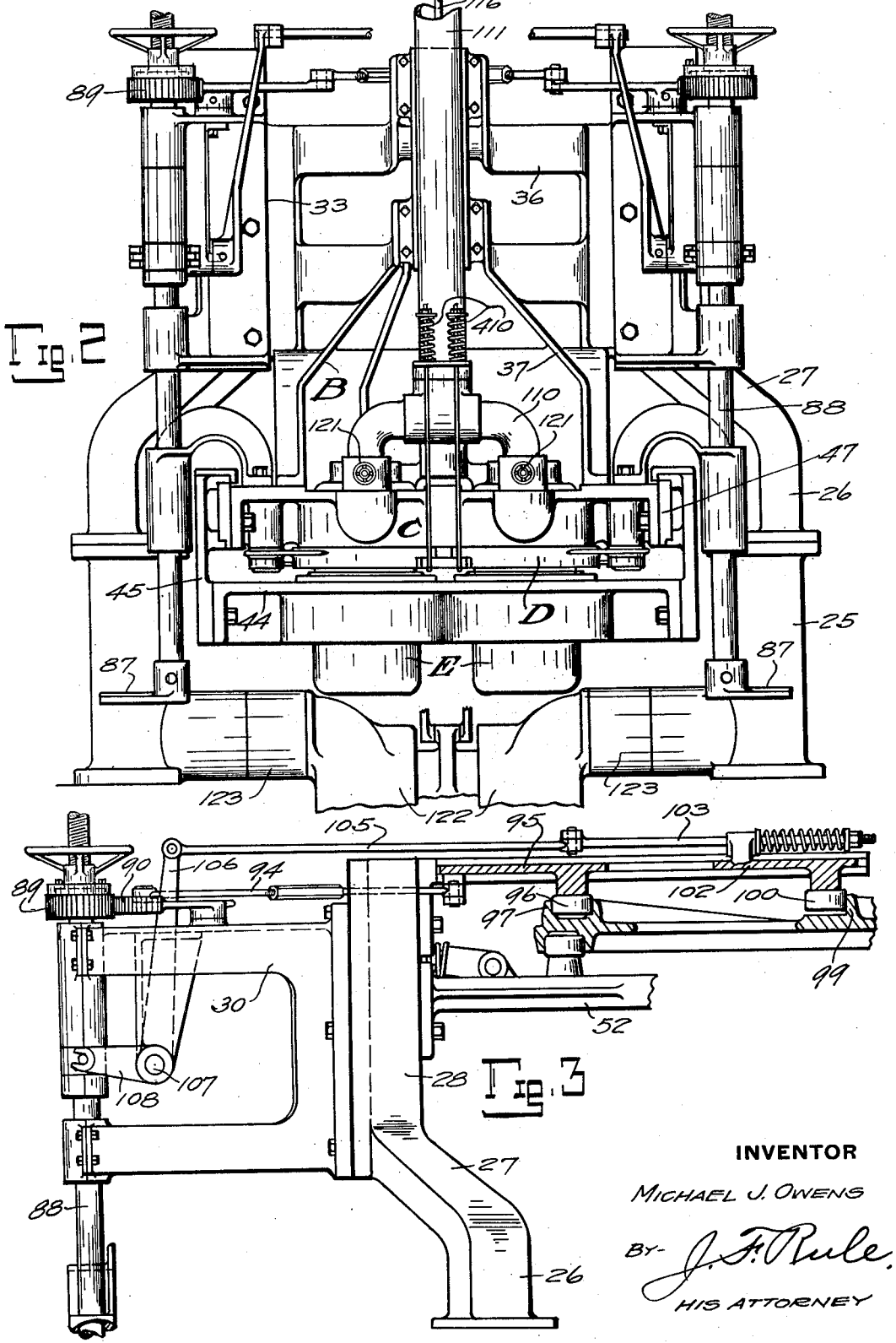
INVENTOR
MICHAEL J. OWENS
BY J. F. Rule
HIS ATTORNEY

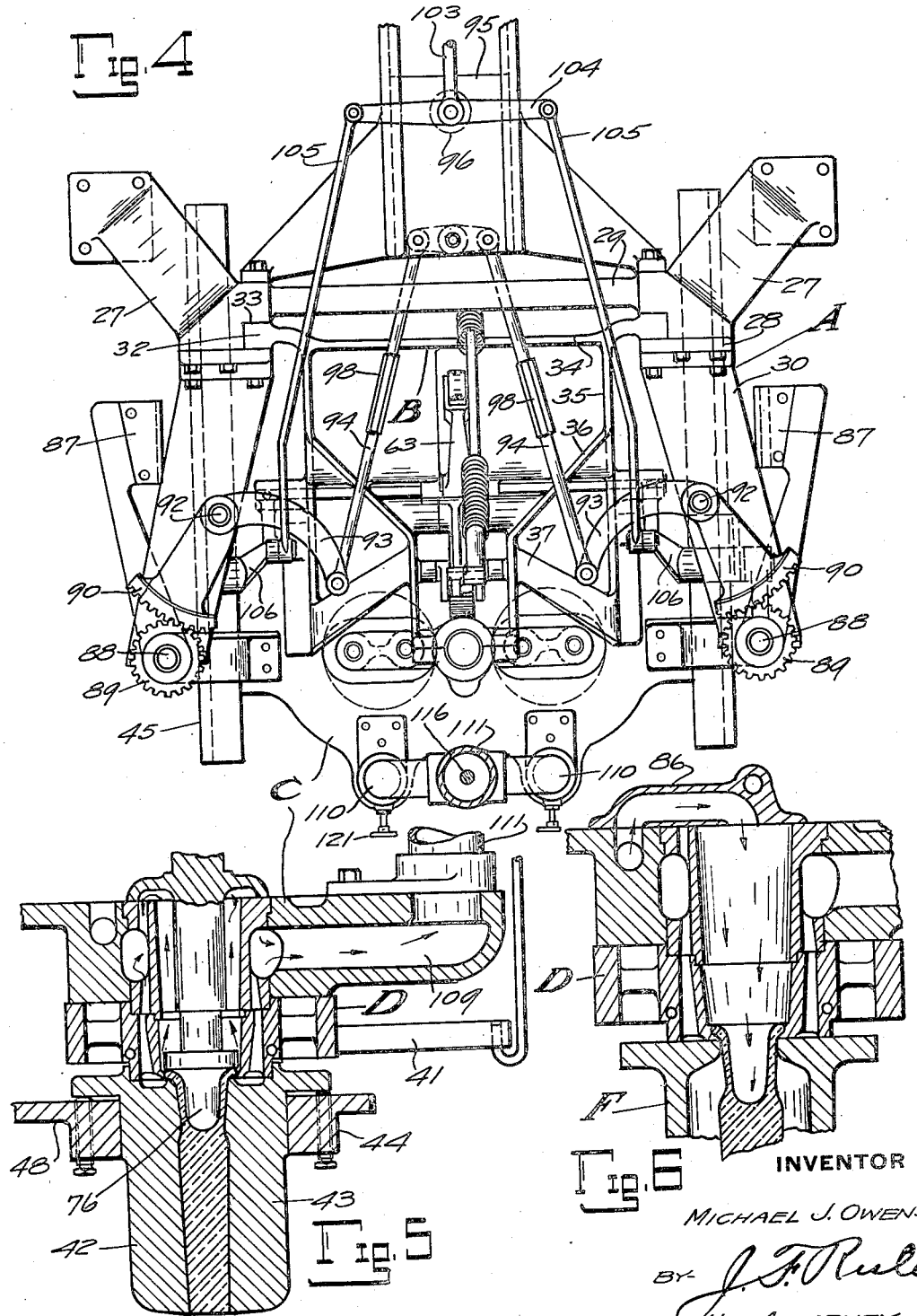

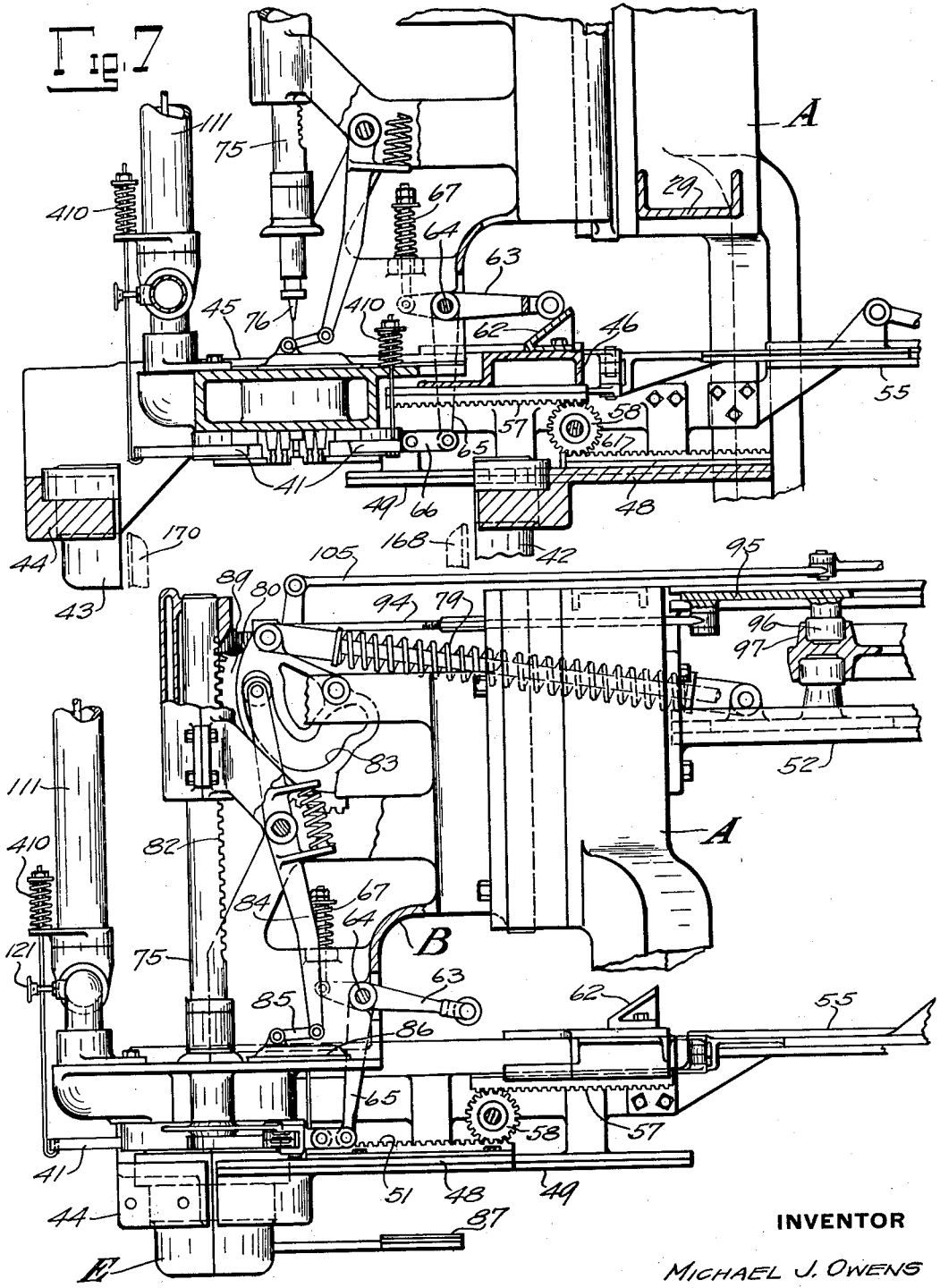

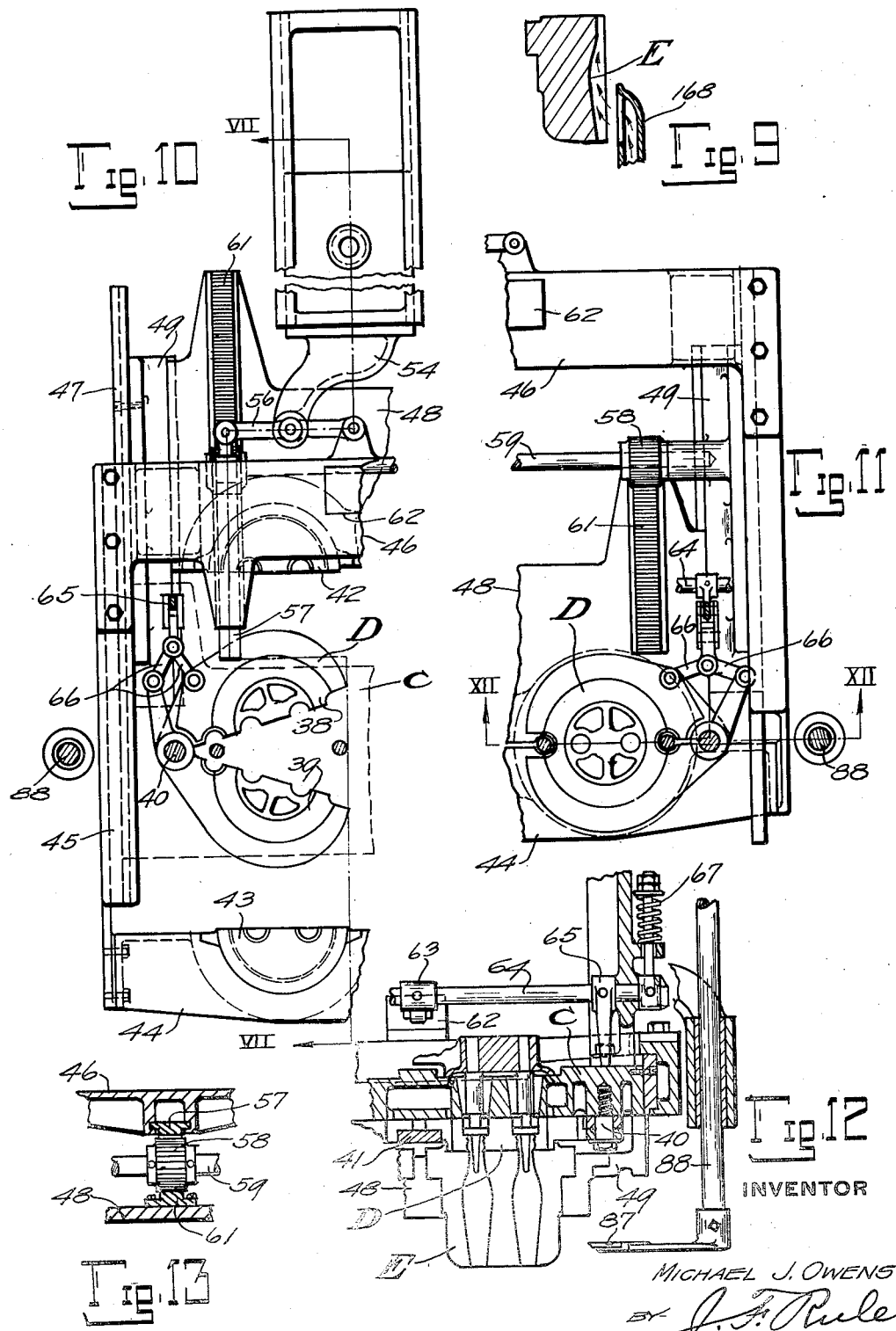

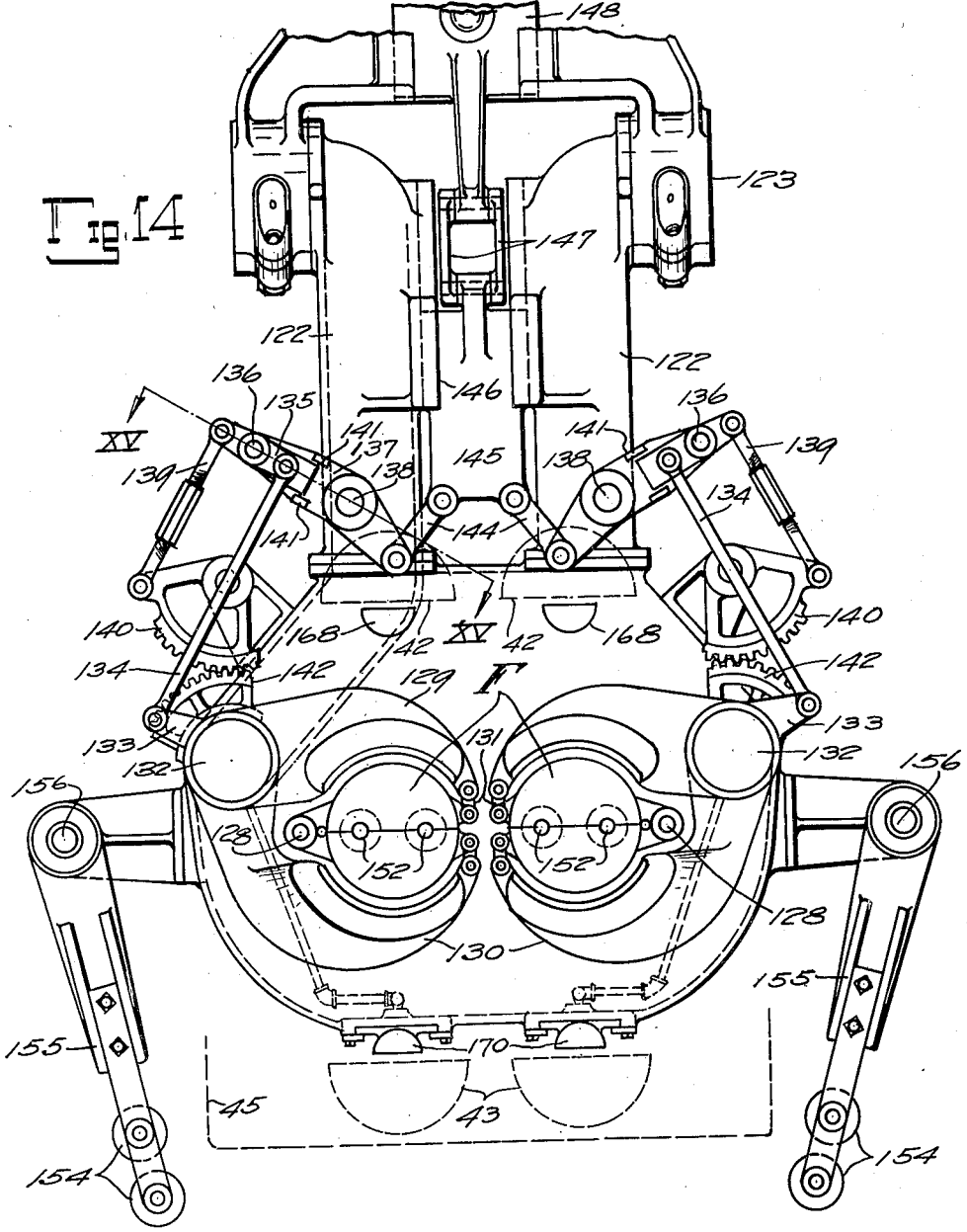
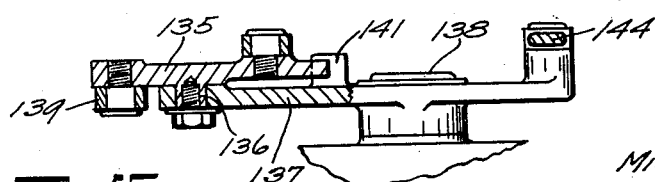

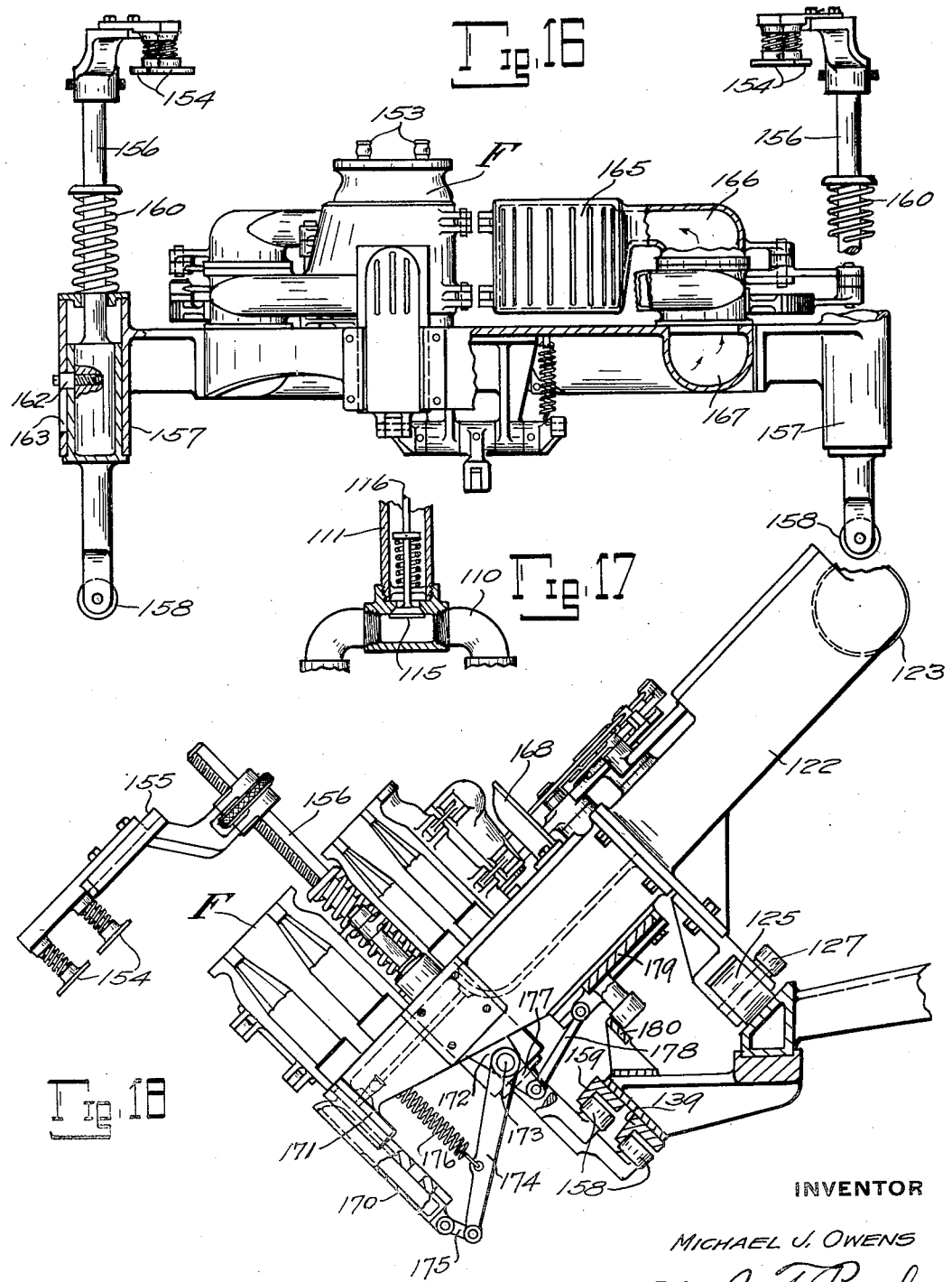

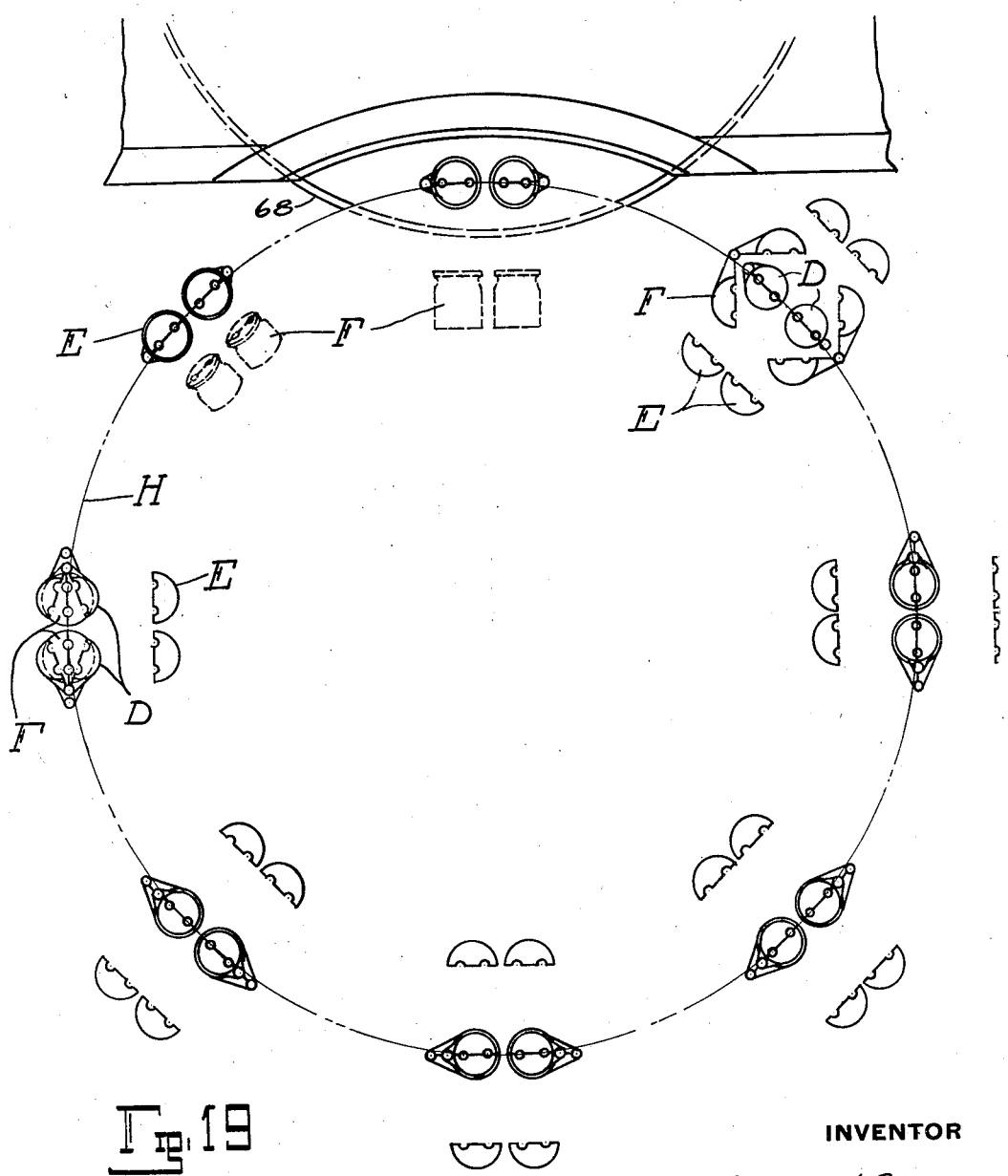

Patented July 28, 1925.

1,547,439

UNITED STATES PATENT OFFICE.

MICHAEL J. OWENS, OF TOLEDO, OHIO, ASSIGNOR TO THE OWENS BOTTLE COMPANY, OF TOLEDO, OHIO, A CORPORATION OF OHIO.

GLASS-FORMING MACHINE.

Application filed August 11, 1921. Serial No. 491,369.

*To all whom it may concern:*

Be it known that I, MICHAEL J. OWENS, a citizen of the United States, residing at Toledo, in the county of Lucas and State of Ohio, have invented new and useful Improvements in Glass-Forming Machines, of which the following is a specification.

My invention relates to glass forming machines and more particularly to machines of the Owens type in which the blank molds on a rotating carriage dip successively into a tank of molten glass and are filled by suction, the blanks being later transferred to finishing molds in which they are blown to finished form. In machines of this type a plurality of heads or units are arranged at equal intervals around the mold carriage, each unit comprising a blank mold in which the charge is gathered by suction, and a finishing mold.

An object of the present invention is to provide a practical machine of this character in which a number of blanks are simultaneously gathered by each unit. Each blank mold may be formed with a number of mold cavities, thereby providing what is herein termed a "plural mold". There may be a number of such plural molds on each head.

An important feature of my invention consists in the arrangement of the mold cavities so that they will all travel in approximately the same path while the molds are in contact with the molten glass during the gathering operation. In this manner the molds are caused to gather glass of uniform temperature and consistency, which has not been found possible with an arrangement of molds traveling in different paths at different distances from the center of the machine. This will be readily understood from a consideration of the fact that in the tank from which the glass is gathered, the temperature varies greatly with the distance from the edge of the tank.

Other features of the invention will appear hereinafter.

In the accompanying drawings, which illustrate a machine constructed in accordance with my invention:

Figure 2 is a front elevation showing a blank mold carrying head or unit, the finishing mold frame being broken away.

Figure 3 is a part sectional side elevation of the head shown in Figure 2.

Figure 4 is a plan view of said head.

Figure 5 is a section through a blank mold, neck mold, and blowing head, with the plunger in operative position.

Figure 6 is a similar view with the blank in the finishing mold and indicating the blowing operation.

Figure 7 is a section at the line VII—VII on Figure 10 and shows one of the heads or units, the blank molds being in open position.

Figure 8 is a similar view with the blank molds closed and also showing mechanism for actuating the plunger.

Figure 9 is a detail showing means for blowing cooling air on an open blank mold.

Figure 10 is a fragmentary plan view showing the left hand portion of a blank mold carrying frame, the blank mold being in open position.

Figure 11 is a similar view of the right hand portion of said frame with the blank mold closed.

Figure 12 is a section at the plane of the line XII—XII on Figure 11.

Figure 13 is a fragmentary view of the racks and pinion for opening and closing the blank mold.

Figure 14 is a plan view of the finishing molds of a unit, together with their supporting frame and actuating mechanism.

Figure 15 is a section at the line XV—XV on Figure 14.

Figure 16 is a part sectional front elevation of the parts shown in Figure 14.

Figure 17 is a detail showing a vaccum controlling valve.

Figure 18 is a part sectional side elevation of the mechanism shown in Figures 14 and 16.

Figure 19 is a diagrammatic view illustrating the path of the molds during the gathering operation.

Figure 1:
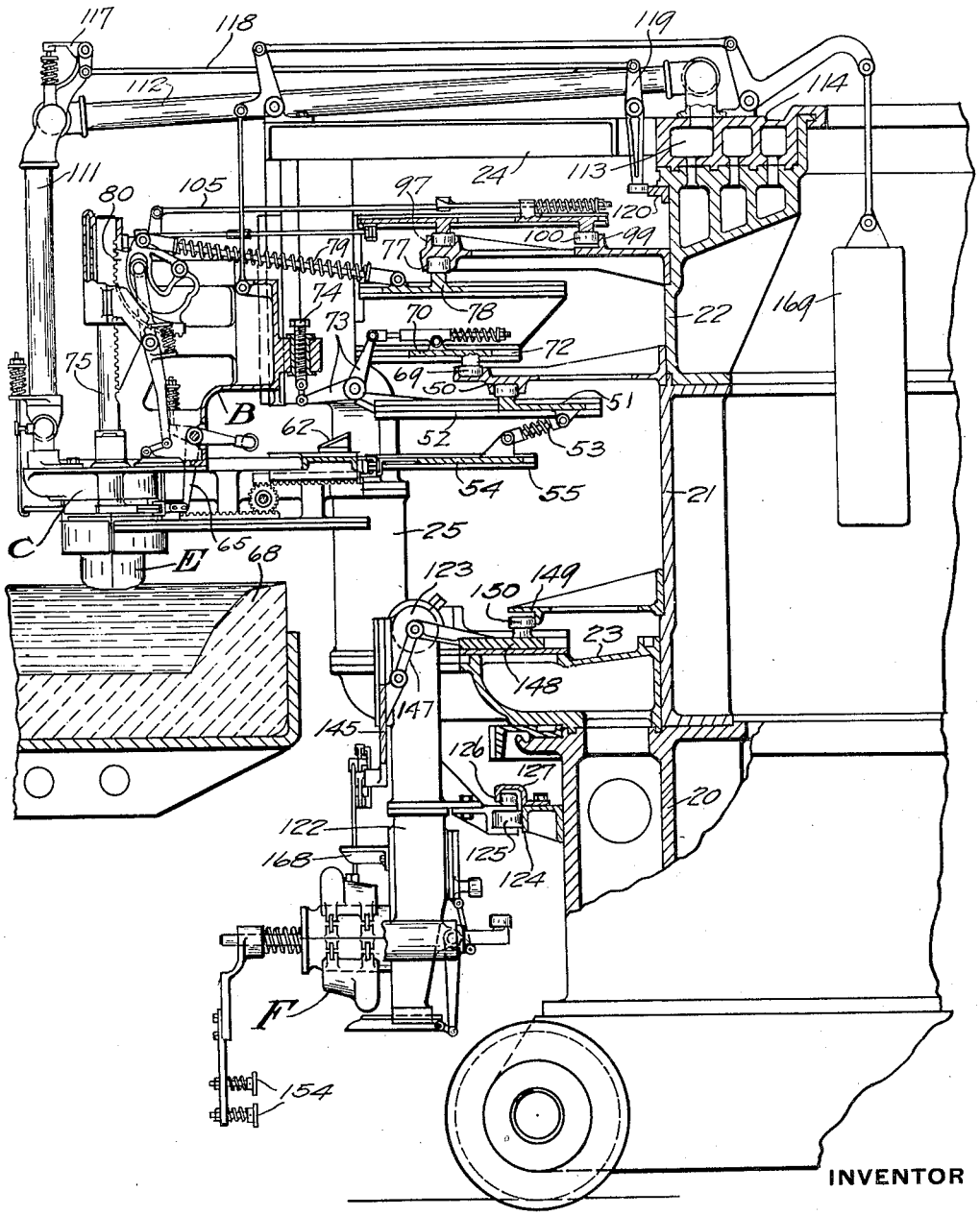
Figure 1 is a sectional elevation of a portion of the machine.

The machine illustrated in the accompanying drawings is of the well known Owens type such as shown, for example, in the patent to La France, No. 1,185,687, granted June 6, 1916, to which patent reference may be had for a detailed disclosure of various features of construction and operation.

Referring particularly to Figure 1, the machine comprises a central stationary column including a lower section 20, an intermediate section 21 and an upper setion 22. Stationary cams for actuating various parts of the machine are mounted on said column. The mold carriage, which is mounted to rotate continuously about the center column, comprises a lower frame portion 23 and an upper frame portion 24, united by the frames which support the individual heads or units arranged at regular intervals around the carriage. Each of said units includes blank molds, finishing molds and mechanism for actuating the molds and for effecting the various operations on the glass. Each unit is supported by a frame-work a cap having a fixed relation to the mold carriage, said frame-work including standards 25 rising from the member 23, and legs 26 bolted to said standards and having inwardly and upwardly inclined portions 27 and vertical portions 28. The frame also includes a cross piece 29 and forwardly extending U-shaped members 30 (Fig. 3).

Mounted to reciprocate vertically in the frame A is a frame B including vertical slide bars 32 slidable in guideways 33 (Fig. 4) in the frame A, a transverse member 34, forwardly extending members 35, diagonal members 36 and upwardly and inwardly inclined members 37. Bolted to the frame B at the lower end thereof is a blowing head C which carries the neck molds D. Each neck mold comprises sections 38 and 39 (Fig. 10) connected by a pivot pin 40 (see Fig. 12) to the under surface of the head C. The free ends of the neck mold sections are supported by a bar 41 (Figs. 7 and 12) to which an upward tension is applied by springs 410. Sectional blank molds E supported from the frame B have their respective sections mounted for horizontal reciprocating movement to open and close the molds. Each blank mold comprises an inner section 42 and an outer section 43. The sections 43 are carried on a transverse frame member 44 to the ends of which are secured rearwardly extending members 45, connected at their rear ends by a transverse frame member 46 which, as shown in Figure 7, is in a higher plane than the front bar 44. This frame carrying the mold sections 43 is mounted to slide on guide bars 47 fixed to the head C. The mold sections 42 are mounted on a supporting head or frame 48 slidably mounted on guide rails 49 having a fixed connection with the rails 47.

The mechanism for opening and closing the blank molds is as follows: A stationary cam 50 (Fig. 1) operates as the carriage rotates to reciprocate a block 51 radially in a guide 52. This block has a link connection 53 with a slide block 54 which reciprocates in guides 55 carried by the head C. The block 54 is connected to an equalizing lever 56 (Fig. 10), one end of which is connected to the frame member 46, and the other end to a rack 57. The rack 57 runs in mesh with one of a pair of pinions 58 on a shaft 59 journalled at its ends in the guide bars 49 on the head C. Racks 61 running in mesh with the pinions 58 are mounted on the frame 48. The cam 50 operates through the connections just described to move the rack bars 57 radially outward or away from the center of the machine, thereby moving the blank mold section 43 outward to the Figure 7 position, and at the same time through the pinions 58 and racks 61, moves the mold section 42 radially inward so that the mold sections are separated to permit the blowing molds to be brought up to operative position, as hereinafter described. The lever 56 has a loose connection with the rack 57, permitting sufficient play for centering the mold sections as they are brought to closed position.

The neck molds D are opened during the final opening movement of the blank molds through the following mechanism: A cam 62 on the frame which carries the blank mold sections 43 is positioned to engage a rock arm 63 as said mold sections 43 approach the limit of their opening movement, and thereby rocks a shaft 64 to which are secured depending rock arms 65 connected through links 66 (Figs. 10 and 11) to the sections 38 and 39 of the neck molds. The latter are thereby opened, as shown in Figure 10. When the blank mold commences its closing movement the neck mold is closed by means of springs 67 operating through the rock shaft 64.

The frame B which carries the blank molds E is lowered to dip them into the molten glass in a tank 68 for gathering charges by suction as the molds pass over the tank. This may be the usual revolving tank. The lowering and lifting of the molds is effected by a stationary cam 69 with which engages a cam roll on a slide block 70 which reciprocates radially in a guide 72 on the main frame of the carriage. The slide 70 is connected through rock arms 73 with an adjusting bolt 74 mounted in the frame B. The frame B is counterbalanced by counterweights 169.

A plunger 75 is provided at its lower end with a core 76 to enter the neck mold and form an initial blow opening in the blank. The plunger is actuated by a cam 77 which operates a slide 78 connected through a link 79 to a gear segment 80 mounted on the frame B. This segment meshes with a rack 82 formed on the plunger. The gear segment 80 is formed with a cam 83 which operates through a lever 84 and link 85 to reciprocate a slide valve 86 which controls the supply of air for blowing the blank in the finishing mold.

The mechanism for severing the string of glass extending from the mold to the supply in the tank as the molds are lifted, comprises cutters 87 at the lower ends of rock shafts 88 mounted for both rocking and vertically reciprocating movements. The mechanism for rocking these shafts (see Figs. 4 and 8) comprises pinions 89 on said shafts actuated by gear segments 90 on rock shafts 92 which carry rock arms 93 connected through links 94 to a slide 95 having a cam roll 96 running on a cam 97. The position of the cutters may be adjusted horizontally by turn buckles 98 in the links 94. Vertical movements are imparted to the knives by a cam 99 (Figs. 1 and 3) on which runs a cam roll 100 on a slide 102 connected through a link 103, yoke 104 (Fig. 4) and links 105 to rock arms 106 on rock shafts 107 to which are also secured rock arms 108 connected with the shafts 88.

The charges of glass are drawn into the blank molds by exhausting the air from the molds when the latter are in contact with the glass in the tank 68. The air is exhausted through a passage 109 (Fig. 5) in the head C. Elbow pipes 110 (Fig. 2) and pipes 111, 112 (Fig. 1) lead to a vacuum chamber 113 in the distributing head 114. The vacuum is cut off except during the gathering operation by a valve 115 (Fig. 17) connected to a rod 116 extending through the vertical pipe 111 and connected through a bell crank 117 and link 118 to a lever 119 operated by a cam 120. Hand valves 121 (Fig. 2) control the individual vacuum passages to the molds, permitting the vacuum to be temporarily disconnected from either mold, where desirable for making repairs or for other purposes.

Referring particularly to Figures 1 and 14 to 18, the finishing molds F are mounted on a frame 122 having a pivotal connection 123 with the mold carriage, permitting said frame and molds to swing downward to the Figure 1 position for passing beneath the tank 68. After passing beyond the tank, the frame is swung upward and the finishing molds close around the blanks suspended from the neck molds, the blanks being then blown to their final shape in the finishing molds. The swinging movements of the frame 122 are controlled by a cam track 124 on which runs a roll 125 on the mold frame. An overhanging guide 126 engaged by a roll 127 on the mold frame, holds the roll 125 on its cam track when the mold frame is swung down to such position that gravity cannot be relied upon to hold it against the track.

Each finishing mold F comprises sections which swing about a pivot 128 for opening and closing the mold. Said sections are connected through links 131 to arms 129 and 130, said arms being mounted to swing about a pivot 132. The arm 129 has an extension 133 connected through a link 134 to a lever 135 pivoted at 136 to a lever 137 which in turn is pivoted at 138 to the frame 122. The lever 135 is also connected through a link 139 to a gear segment 140 which meshes with a segment 142 on the arm 130. The lever 137 is connected through a link 144 to a slide block 145 which reciprocates in guides 146 on the frame 122. Said slide has a link connection 147 with a slide 148 which reciprocates radially in the frame member 23. The slide 148 is reciprocated by a stationary cam 149 with which engages a cam roll 150 on said slide, and thereby operates through the connections just described, to open and close the molds F. The lever 135 has a slight movement or play between stops 141 on the lever 137 to permit a slight relative movement of the mold sections as the mold closes so that said sections will automatically adjust themselves to their closed position. The link connection 147 permits the frame 122 to swing downward to the Figure 1 position.

The finishing molds F are herein shown as plural molds, each having a plurality of mold cavities 152, the number and position of which correspond with those of the blank molds. The molds F, as shown in Figure 14, are arranged in pairs and the mold cavities are arranged in a line perpendicular to a radius of the machine extending between the molds, or the mold cavities may be arranged in the arc of a circle concentric with the axis about which the machine rotates. It will be seen that with this arrangement the mold cavities during the rotation of the mold carriage, all travel in the same arc or substantially the same arc. The blank mold cavities are arranged in the same manner, and all travel in the same circle H, Figure 19. This is an important feature of the invention, as the molds are thereby caused to travel in substantially the same path through the glass in the tank during the gathering operation, so that glass of the same temperature and consistency will be supplied to all the molds. This will be appreciated when it is considered that the glass in the tank adjacent the outer walls thereof is at a substantially lower temperature and much stiffer than the glass a little farther away from said walls. In order to get uniform results in the finished ware it is essential that the glass when taken into the molds be of the same temperature and consistency in all of the molds.

The finished bottles 153 are temporarily held during the opening of the finishing molds, by so-called "knock-out disks" 154 carried on arms 155 mounted on rock shafts 156. The rock shafts are journalled for both endwise and rotative movement in bearings 157 on the finishing mold frame. The shafts 156 are provided at their lower ends with rolls 158 which during the travel of the carriage engage cams 159 (Fig. 18) whereby a downward endwise movement is imparted to said shafts against the tension of coiled springs 160. A pin 162 (Fig. 16) fixed to said shaft, moves up and down in a cam slot 163 in the bearing sleeve 157, said slot being so shaped that during the initial downward movement of the shafts the latter are rotated to swing the disks 154 inward to positions directly over the bottles, the disks being then moved down into engagement with the upper ends of the bottles whereby the latter are held during the opening of the molds. The construction, operation and function of the knock-out disks are substantially similar to those disclosed, for example, in the patent to La France, No. 1,319,098, October 21, 1919, to which reference may be had for a full disclosure.

Air for cooling the molds F is supplied through blowing heads 165 to which air is conducted through passages 166, 167 (Fig. 16) connected with a suitable source of air supply, as is usual in this type of machine.

The finishing mold frame 122 also carries cooling nozzles 168 and 170 (see Figs. 14 and 18) which, when the finishing mold frame is swung upward, supply air to cool the blank molds. The nozzle 170 is mounted for reciprocation in a slideway 171 formed on the forward end of the frame 122 and when in operative position, projects above the surface of the finishing mold carriage. To permit the bottles to be discharged from the molds, the nozzle is moved downward by the following mechanism: Depending from the frame 122 is a bracket 172 carrying a rock shaft 173 free to turn therein, and attached to said shaft are levers 174 connected to the nozzles 170 by links 175. The nozzles are held in operative position by a spring 176 attached to the lever 174 and the frame 122. Also fastened to the rock shaft is a short lever 177 connected to a slide 179 by a link 178, this slide through the above connections operating to retract the nozzles and is actuated by a short cam segment 180. The retraction of the nozzles is only long enough to allow the articles to be discharged from the molds.

The operation of this machine will be understood from the foregoing description, but may be briefly stated as follows: The mold carriage rotates continuously and brings the several units successively to gathering position in which the blank molds E are over the glass in the tank 68. When a unit reaches this position, its blank mold frame B is lowered through the operation of the cam 69, causing the blank molds to dip into the glass. Suction is then applied to fill the blank molds, as indicated in Figure 5, and form the neck of the bottle in the neck mold D, the plunger core 76 being at this time in its lowered position. The blank molds are now lifted and the cutters 87 swing inward to sever the string of glass extending from the mold to the glass in the tank, the cutters forming temporary bottoms or closures for the molds. The plungers are now lifted by the cam 77 operating through the gear segment 80. This movement of the gear segment also moves the valve 86 to the Figure 6 position, permitting air to be supplied for blowing the blank. When the molds have passed beyond the tank the blank mold sections are separated, as indicated in Figure 10, leaving the bare blanks supported in the neck molds. The finishing mold frame 122 is now swung up and the finishing molds closed around the bare blanks. The blanks are blown in the finishing molds after which the neck molds D are opened. As the molds approach discharging position, the knock-out discs 154 are swung inward and lowered to engage the tops of the bottles and hold them while the molds open. This movement of the disks is then reversed, releasing the bottles and allowing them to drop by gravity from the molds.

Modifications may be resorted to within the spirit and scope of my invention.

The present application discloses subject matter which is also disclosed and claimed in the co-pending application of Richard La France, Serial Number 708,172, filed April 22, 1924, machines for forming glass articles.

What I claim is:

1. In a glass forming machine, the combination of a carriage, means to rotate it continuously about a vertical axis, individual heads or units thereon, a plurality of sectional molds on each head arranged to travel in substantially the same path, means to bring the molds on each head concomitantly into contact with a supply of molten glass, means to then charge the molds by suction, and means to shape the charges into finished articles while traveling in substantially the same circular path concentric with said axis.

2. In a glass forming machine, the combination of a mold carriage, means to rotate it continuously about a vertical axis, molds thereon having mold cavities arranged to travel in substantially the same path, means to lower said molds into contact with a supply of molten glass and cause a simultaneous charging of a plurality of said mold cavities with the molten glass, and means to shape the charges into finished articles while traveling in said path.

3. In a glass forming machine, the combination of a rotary mold carriage, a dipping head thereon, a plural blank mold on said head having mold cavities arranged to travel in substantially the same path, means to dip said head and bring the mold into contact with a supply of molten glass, means to then fill the mold cavities from said supply, and means to form the blanks into finished articles while traveling in said path, including a plural cavity finishing mold and means to blow the blanks therein.

4. In a glass forming machine, the combination of a rotary mold carriage, a dipping head thereon, a plural cavity blank mold on said head having mold cavities arranged to travel in substantially the same path, means to dip said head and bring the mold into contact with a supply of molten glass, means to simultaneously fill the mold cavities by suction, and means to form the blanks into finished articles while traveling in said path, including a plural cavity finishing mold and means to blow the blanks therein.

5. In a glass forming machine, the combination of a mold carriage, means to rotate it continuously about a vertical axis, sectional blank molds thereon arranged to travel in substantially the same path, means to simultaneously bring a plurality of said molds into gathering position in contact with a supply of molten glass, means to then apply suction to the molds, means to open the molds by moving the sections of each mold respectively toward and from said axis, leaving the bare blanks traveling in said path, finishing molds, means to close them about the blanks, and means to blow the blanks therein during their continued travel in said path.

6. In a glass forming machine, the combination of a rotary mold carriage, a dipping head thereon, plural molds on said head separate from each other and each comprising separable mold sections, each of said molds being formed with a plurality of mold cavities, said molds arranged at substantially the same radial distance from the axis of rotation of the mold carriage, the mold cavities in each mold being also at substantially the same distance from said axis, and means to dip said head and charge the molds by suction.

7. In a glass gathering machine, the combination of a mold carriage, means to rotate it continuously about a vertical axis, a sectional mold frame carried thereby, blank mold sections carried by said frame sections, means to move the frame sections rectilinearly toward and from each other in a direction radial to the mold carriage and thereby move the mold sections to and from each other, said sections being provided with a series of mold cavities at substantially equal distances from the center of the machine, neck molds adapted to register with the blank molds, means to charge the molds, said neck molds being operative to support the bare blanks when the blank molds are opened, finishing molds to enclose the blanks, and means to blow the blanks in the finishing molds.

8. In a glass forming machine, the combination of a rotary mold carriage, a dipping head thereon comprising frame sections movable radially of the machine toward and from each other, blank mold sections carried by said frame sections and brought together by the movement of the frame sections, a neck mold arranged to register with the blank mold sections when the latter are brought together, means to lower said head and charge the molds by suction with molten glass from a supply pool, means to operate the frame sections to separate the blank mold sections and leave the blanks of glass supported in the neck mold, a finishing mold, and means to close it around the suspended blank.

9. In a glass forming machine, the combination of a rotary mold carriage, a dipping head thereon comprising frame sections movable radially of the machine toward and from each other, blank mold sections carried by said frames sections, a neck mold arranged to register with the blank mold sections when the latter are brought together and operable to support a bare blank when the blank mold sections are separated, a sectional finishing mold, and means to move it upward between the blank mold sections when the latter are separated and close it about said blank.

10. In a glass forming machine, the combination of a mold carriage, a series of mold groups thereon, each including a plurality of separate molds, each mold comprising separable sections having meeting faces each formed with a plurality of mold cavities, the molds of a group being arranged side by side with the meeting faces for all of the molds in substantially the same plane, and automatic means for supplying charges of glass to the mold groups in succession, all the molds of a group being charged at about the same time.

Signed at Toledo, in the county of Lucas and State of Ohio, this 5th day of August, 1921.

MICHAEL J. OWENS.